United States Patent
Sato

(10) Patent No.: US 7,884,327 B2
(45) Date of Patent: Feb. 8, 2011

(54) VEIN IMAGING APPARATUS, VEIN IMAGING METHOD AND VEIN AUTHENTICATION APPARATUS

(75) Inventor: Hideo Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/545,361

(22) Filed: Aug. 21, 2009

(65) Prior Publication Data

US 2010/0046807 A1 Feb. 25, 2010

(30) Foreign Application Priority Data

Aug. 25, 2008 (JP) .......................... P2008-215841

(51) Int. Cl.
*G02F 1/01* (2006.01)

(52) U.S. Cl. ...................................... 250/330

(58) Field of Classification Search ................ 250/330; 382/115, 274; 600/381, 473
See application file for complete search history.

(56) References Cited

U.S. PATENT DOCUMENTS

| 2008/0031497 A1 | 2/2008 | Kishigami et al. |
| 2008/0221421 A1* | 9/2008 | Choi et al. ................... 600/363 |
| 2010/0061598 A1* | 3/2010 | Seo ............................. 382/115 |

FOREIGN PATENT DOCUMENTS

| JP | 7-135555 | 5/1995 |
| JP | 2004-13804 | 1/2004 |
| JP | 2008-36058 | 2/2008 |

OTHER PUBLICATIONS

Shahin et al., "biometric authentication using fast correction of near infrared hand vein patterns," 2006, International Journal of Biological and Life Sciences, vol. 2, No. 3, pp. 141-148.*

* cited by examiner

*Primary Examiner*—David P Porta
*Assistant Examiner*—Kiho Kim
(74) *Attorney, Agent, or Firm*—Finnegan, Henderson, Farabow, Garrett & Dunner, L.L.P.

(57) ABSTRACT

A vein imaging apparatus of the present invention includes: a lens array to which a plurality of light receiving lenses are arranged in an array shape; a plurality of near-infrared light irradiation sources which are respectively arranged at opposing ends of the lens array and which irradiate a part of a living body with near-infrared light; an imaging element which generates a pickup image of a vein based on near-infrared light which is collected by the lens array and which is scattered in the living body and penetrates through the vein; and a brightness adjustment unit which adjusts brightness of the near-infrared light radiated from the near-infrared light irradiation source in accordance with a synchronization signal for controlling the imaging element and distance from the near-infrared light irradiation source.

9 Claims, 8 Drawing Sheets

BRIGHT ← DARK → BRIGHT

DARK → BRIGHT ← DARK

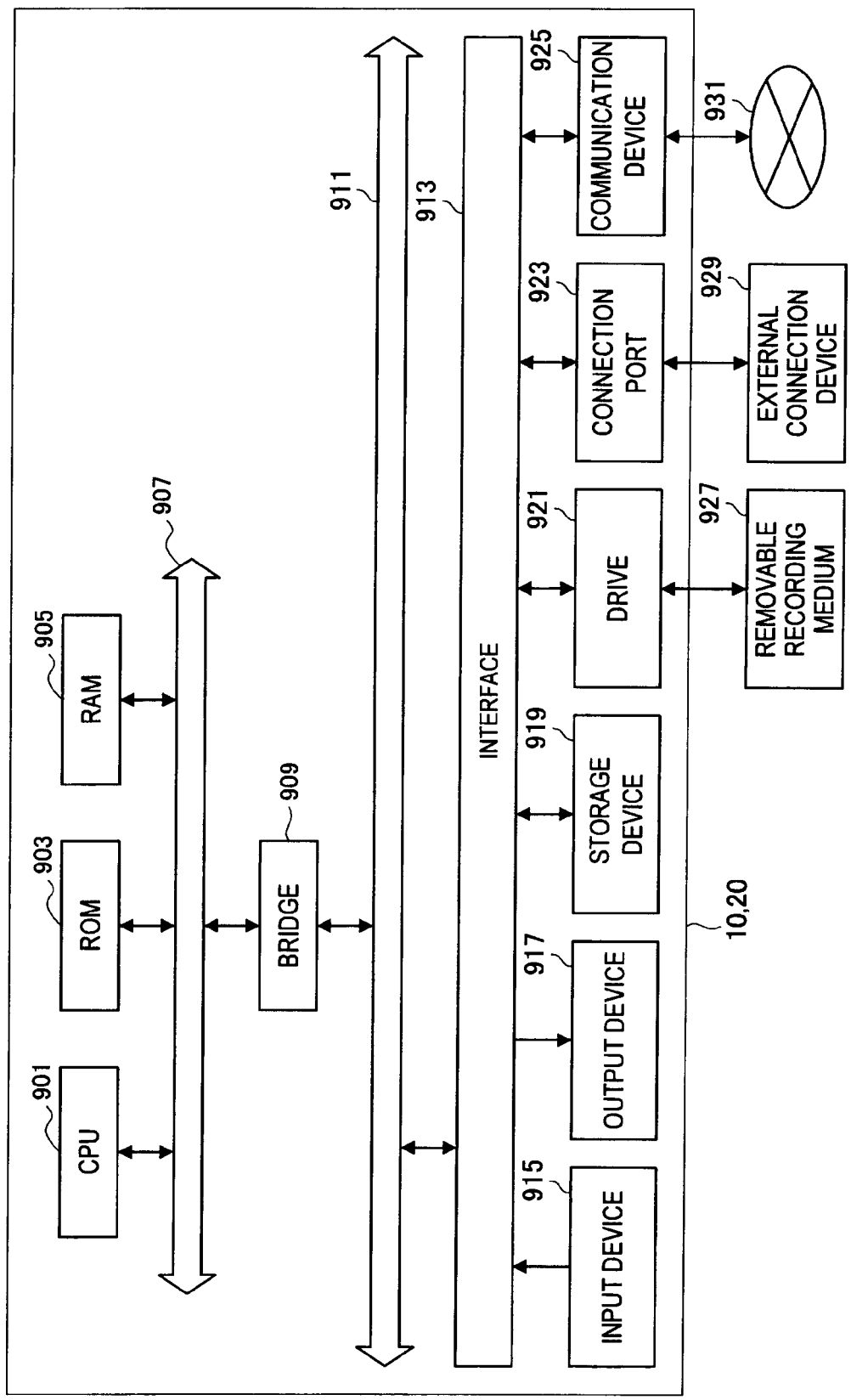

VEIN IMAGING APPARATUS, VEIN IMAGING METHOD AND VEIN AUTHENTICATION APPARATUS

BACKGROUND OF THE INVENTION

1. Field of the Invention

The present invention relates to a vein imaging apparatus, a vein imaging method and a vein authentication apparatus.

2. Description of the Related Art

In the future networked society, a biometric individual authentication is a highly important technology to protect private rights. In particular, for commercial transaction in which money, contents and rights may be stolen across the Internet by spoofing of other persons, the biometric individual authentication has been paid attention as the technology for protecting an area which may not be solved only by a code. Here, an issue of forgery remains with a fingerprint and an iris. From this viewpoint, the individual authentication technology of a vein pattern utilizing a part which may not be easily imaged is expected to be the biometric individual authentication of the next generation because of accuracy of determination and difficulty for forgery and spoofing.

A fingerprint authentication technology and a vein authentication technology are examples of the biometric individual authentication technology. With the fingerprint authentication technology, there are issues that approximate four percents of users may not be registered and that resistance for spoofing by a remaining fingerprint may not be sufficient. However, there is an advantage that the sensor can be downsized since image composition can be easily performed with a scan type which utilizes a line sensor, an area sensor or the like. On the other hand, the vein authentication technology which is expected as the next generation authentication technology without having these issues is difficult to be mounted on mobile equipment etc. since the sensor is large. In particular, with an imaging type which utilizes a penetration image of vein, it has been difficult to configure devices to be plane-shaped since restrictions of location of a light source are severe.

In order to achieve downsizing of a device utilizing the vein authentication technology, a microlens array in which microlenses are arranged in an array shape is adopted in Japanese Patent Application Laid-Open No. 2008-36058.

SUMMARY OF THE INVENTION

In addition to utilizing the microlens array, it may be necessary that the light source which irradiates light to a living body serving as an imaging object is integrated with the device in order to achieve downsizing of the device. However, in the case that the light source is integrated with the device, the strength of the light radiated from the light source rapidly decreases as being apart from the light source. Several methods may be considered as a solution for this issue. However, considering restrictions in a case that the device is mounted on different equipment, a satisfactory solution has not been obtained.

The present invention has been made in views of the above issues and it is desirable to provide a vein imaging apparatus, a vein imaging method and a vein authentication apparatus which are newly improved to be capable of easily obtaining a vein image of uniform brightness while achieving downsizing of the apparatus.

According to an embodiment of the present invention, there is provided a vein imaging apparatus including: a lens array to which a plurality of light receiving lenses are arranged in an array shape; a plurality of near-infrared light irradiation sources which are respectively arranged at opposing ends of the lens array and which irradiate a part of a living body with near-infrared light; an imaging element which generates a pickup image of a vein based on near-infrared light which is collected by the lens array and which is scattered in the living body and penetrates through the vein; and a brightness adjustment unit which adjusts brightness of the near-infrared light radiated from the near-infrared light irradiation source in accordance with a synchronization signal for controlling the imaging element and distance from the near-infrared light irradiation source.

With the abovementioned configuration, the brightness adjustment unit adjusts brightness of the near-infrared light radiated from the near-infrared light irradiation source in accordance with a synchronization signal for controlling the imaging element and distance from the near-infrared light irradiation source.

The imaging element preferably performs line scanning in the direction perpendicular to a side of the lens array to which the near-infrared light irradiation source is arranged.

The brightness adjustment unit preferably varies brightness of the near-infrared light with time along the scanning direction of the imaging element.

The brightness adjustment unit preferably decreases the brightness of the near-infrared light at the vicinity of the near-infrared light irradiation source and increases the brightness of the near-infrared light toward the approximate center of the lens array.

The brightness adjustment unit may vary the brightness with time in accordance with a predetermined correction curve.

The brightness adjustment unit may further include a current control unit which controls current amount to be supplied to the near-infrared light irradiation source.

The brightness adjustment unit may further include an ON-OFF control unit which performs ON-OFF control of the near-infrared light irradiation source, and the ON-OFF control unit may vary the brightness with time in accordance with width and frequency of a pulse which is used for the ON-OFF control of the near-infrared light irradiation source.

According to another embodiment of the present invention, there is provided a vein imaging method including the steps of: irradiating a part of a living body with near-infrared light of which brightness is adjusted by a vein imaging apparatus; and imaging the part of the living body which is irradiated with the brightness adjusted near-infrared light in accordance with a synchronization signal and generating a pickup image of a vein, wherein the vein imaging apparatus includes a lens array to which a plurality of light receiving lenses are arranged in an array shape, a plurality of near-infrared light irradiation sources which are respectively arranged at opposing ends of the lens array and which irradiate the part of the living body with near-infrared light, an imaging element which generates the pickup image of the vein based on near-infrared light which is collected by the lens array and which is scattered in the living body and penetrates through the vein, and a brightness adjustment unit which adjusts brightness of the near-infrared light radiated from the near-infrared light irradiation source in accordance with the synchronization signal for controlling the imaging element and distance from the near-infrared light irradiation source.

According to another embodiment of the present invention, there is provided a vein authentication apparatus including: a vein imaging unit; a vein pattern extraction unit which extracts a vein pattern from a pickup image of a vein generated by the vein imaging unit; and an authentication unit which performs an authentication process based on the extracted vein pattern, wherein the vein imaging unit includes a lens array to which a plurality of light receiving lenses are arranged in an array shape, a plurality of near-infrared light irradiation sources which are respectively arranged at opposing ends of the lens array and which irradiate a part of a living body with near-infrared light; an imaging element which generates the pickup image of the vein based on near-infrared light which is collected by the lens array and which is scattered in the living body and penetrates through the vein; and a brightness adjustment unit which adjusts brightness of the near-infrared light radiated from the near-infrared light irradiation source in accordance with a synchronization signal for controlling the imaging element and distance from the near-infrared light irradiation source.

According to the embodiments of the present invention described above, it is possible to easily obtain a vein image of uniform brightness while achieving downsizing of the apparatus.

BRIEF DESCRIPTION OF THE DRAWINGS

FIG. 8 is a block diagram which describes the hardware configuration of the vein imaging apparatus according to each of the embodiments of the present invention.

DETAILED DESCRIPTION OF THE PREFERRED EMBODIMENTS

Figure 1:
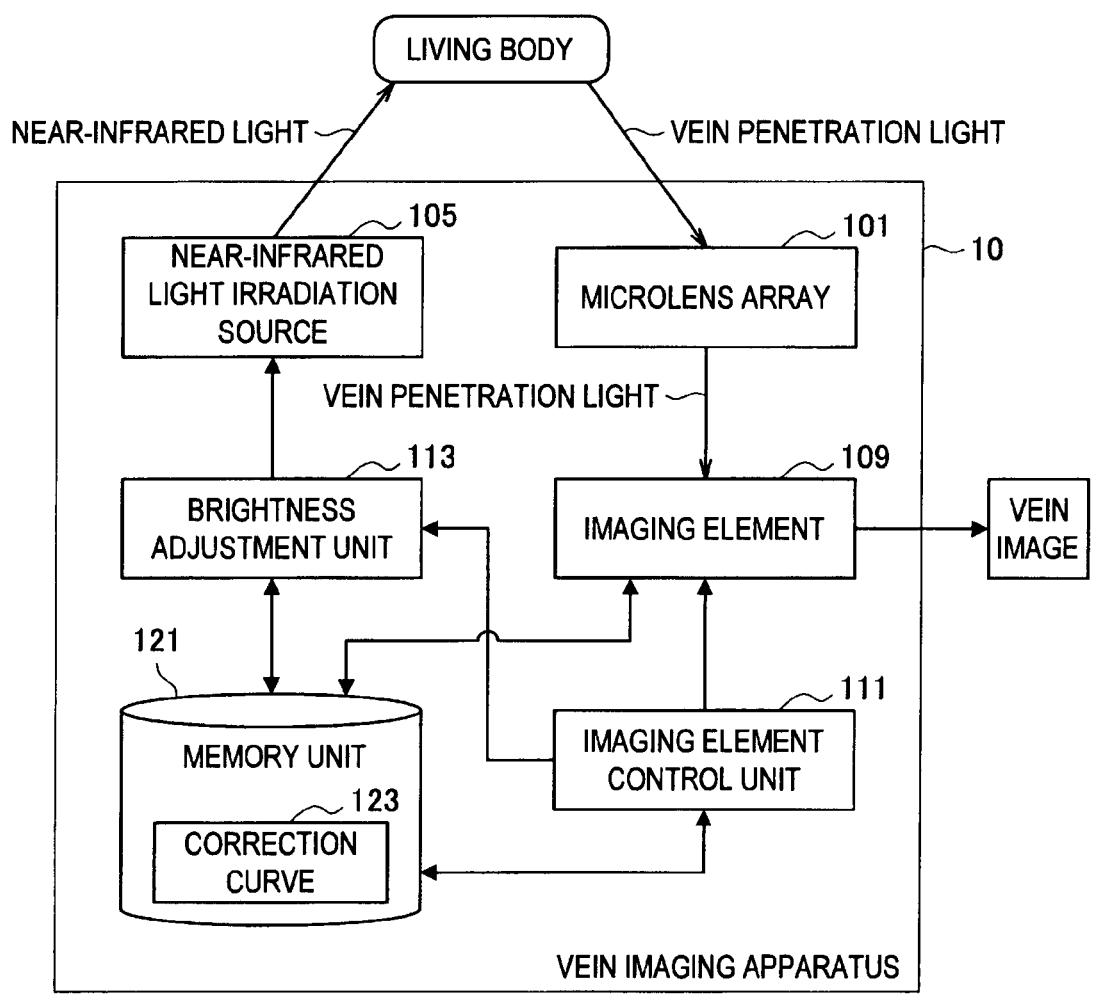
FIG. 1 is a block diagram which describes the configuration of a vein imaging apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Here, the description is performed in the following order.
(1) The first embodiment
(1-1) Configuration of the vein imaging apparatus
(1-2) Operation of the vein imaging apparatus
(1-3) Examples of mounting of the vein imaging apparatus to the vein authentication apparatus
(2) Hardware configuration of the vein imaging apparatus according to each of the embodiments of the present invention
(3) Summary Through the abovementioned study, the following observation has been obtained by the inventor of the present invention. With a vein imaging apparatus in the related art, it has been difficult to take an image of a fine vein such as a finger vein unless the imaging apparatus and the lighting apparatus are distanced to some extent. This is because near-infrared light radiated into the finger is scattered significantly due to a living body. In general, it is said that 70% or more of the near-infrared light radiated into a living body reaches only to a dermis layer. Therefore, the light radiated from the imaging apparatus side becomes reflecting light by the dermis. Accordingly, with the disturbance of the reflecting light, the contrast of the fine vein image which is the shade by absorption of the scattered light from the backside decreases significantly. Consequently, imaging becomes difficult. Therefore, the usage of the vein imaging apparatus of the related art has been limited to a large vein such as the palm or the back of a hand.

As described later, the vein imaging apparatus according to each of the embodiments of the present invention includes a flat sensor which uses a microlens array and an integrated lighting apparatus which is arranged in the vicinity of a panel. In each of the embodiments of the present invention, it becomes possible to perform imaging of selective light only from the backside of a vein by providing a directivity control plate or an orifice which is arranged so as to extract the selective light to each of the microlens array and the light source. In this manner, integration of the light source and the sensor which has been difficult for an optical system in the related art is actualized.

However, with the abovementioned configuration, following three issues occur since the strength and brightness of the light rapidly decreases as being apart from the vicinity of the lighting apparatus.

1. The whole is difficult to be taken with one shot of imaging since the brightness distribution of the vicinity of the lighting apparatus and the center is too large.

2. When lighting is adjusted to the sensitivity at the center, the photoreceptors are saturated at the vicinity of the lighting apparatus so that imaging becomes difficult.

3. When lighting is adjusted to the sensitivity at the vicinity of the lighting apparatus, the S/N ratio at the center decreases so that imaging becomes difficult.

In order to solve the abovementioned issue, a solution method which utilizes a brightness distribution filter having an optical distribution has been proposed in related art. However, some issues which are described below remain unsolved. Therefore, the method is difficult to be practically actualized.

1. Presently, a TFT near-infrared sensor which is used for an imaging element is insufficient in both sensitivity and a dynamic range. By using the brightness distribution filter, the sensitivity and the dynamic range are further decreased.

2. Since the sensor sensitivity is significantly decreased, lighting with a high brightness irradiation source may be necessary.

3. An image correction process to correct influence of the optical brightness distribution filter is significantly difficult.

4. Since brightness unevenness is purposely generated, it may not be utilized for a sensor display.

5. Since variation in sensor sensitivity is generated, it may not be utilized for a touch pad sensor.

In particular, No. 4 and No. 5 become critical defects for an expected embodiment of a flat sensor.

According to each of the embodiments of the present invention, the vein imaging apparatus as described below is provided by the inventor of the present invention in order to solve the abovementioned issues.

First Embodiment

<Configuration of the Vein Imaging Apparatus>

Figure 2:
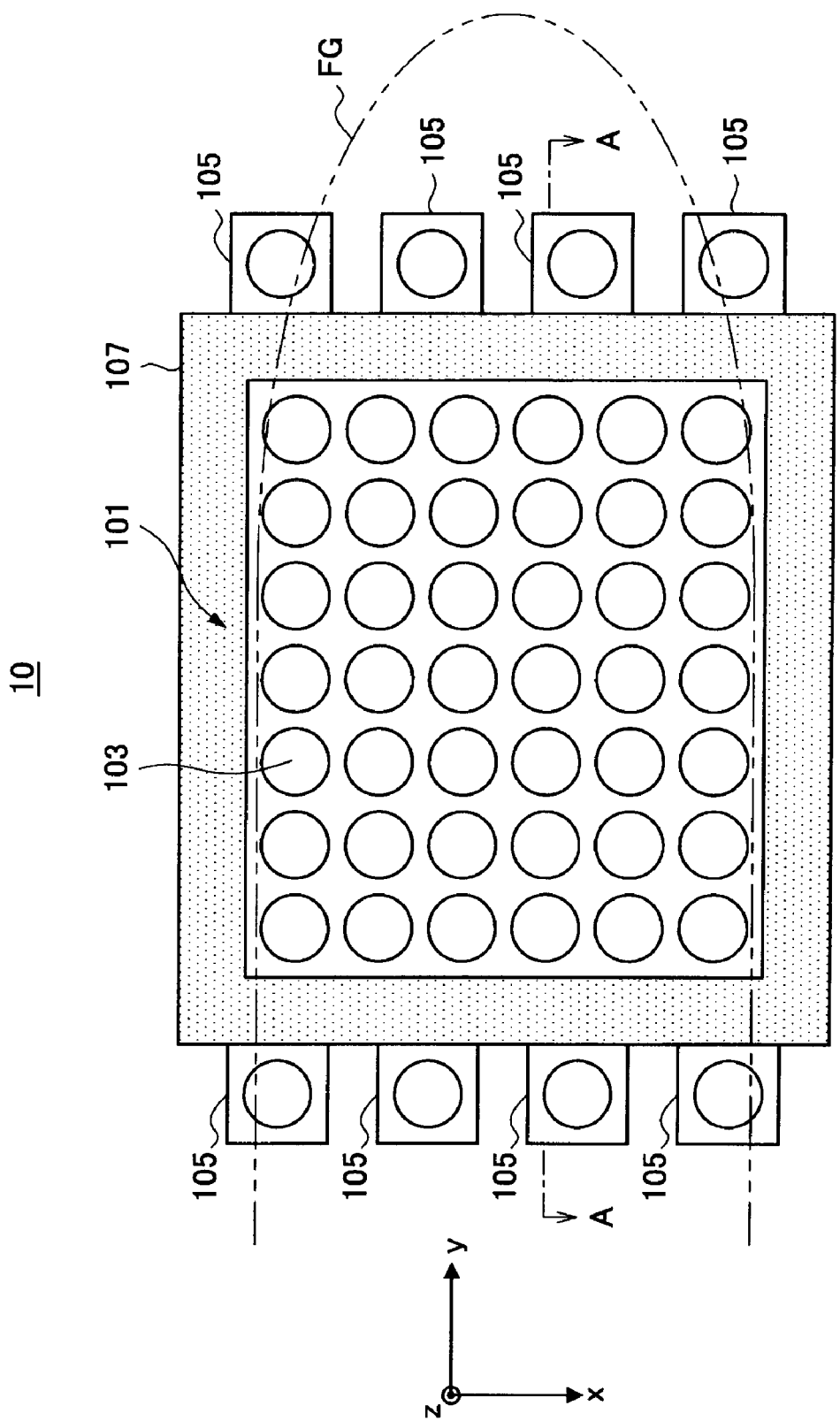
FIG. 2 is a plane view of the vein imaging apparatus according to the present embodiment.
Figure 3:
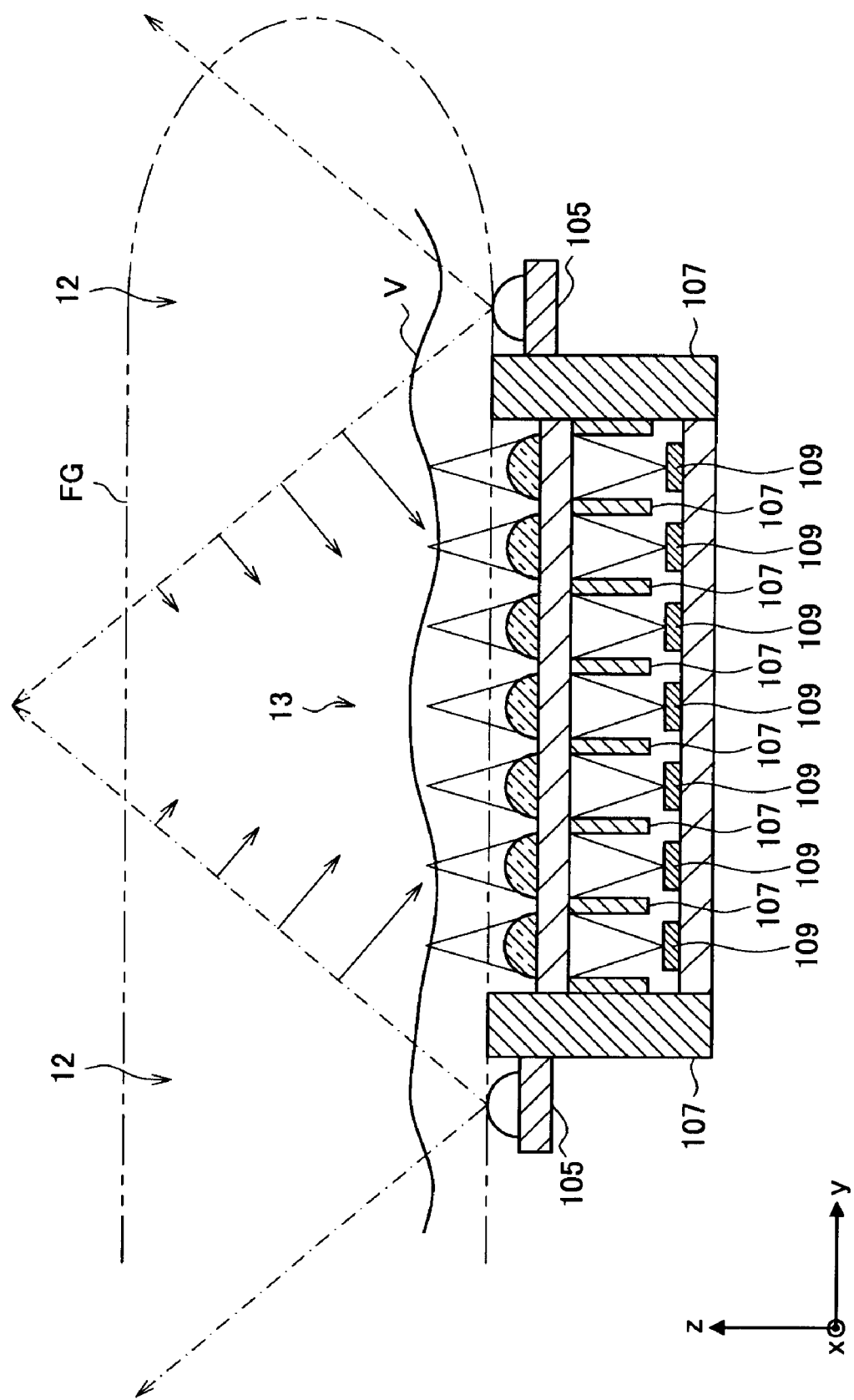
FIG. 3 is a sectional view which is sectioned at line A-A in FIG. 2.

First, the configuration of the vein imaging apparatus according to the first embodiment of the present invention is described in detail with reference to FIGS. 1 to 3. FIG. 1 is a block diagram which describes the configuration of the vein imaging apparatus according to the present embodiment. FIG. 2 is a plane view of the vein imaging apparatus according to the present embodiment. Then, FIG. 3 is a sectional view which is sectioned at line A-A in FIG. 2.

For example, as illustrated in FIG. 1, a vein imaging apparatus 10 according to the present embodiment mainly includes a microlens array (MLA) 101, a near-infrared light irradiation source 105, an imaging element 109, a brightness adjustment unit 113, and a memory unit 121. The vein imaging apparatus 10 images a part (for example, a finger) of a living body which is put thereon and generates a pickup image of a vein (i.e., a vein image) which exists in the living body.

The microlens array (MLA) 101 receives near-infrared light (hereinafter, also called the vein penetration light) which penetrates a vein in a living body after being radiated to a part of the living body from the later-mentioned near-infrared light irradiation source 105 and introduces the light to the later-mentioned imaging element 109.

The near-infrared light irradiation source 105 irradiates the near-infrared light which has a predetermined frequency band against the part of the living body which is put on the vein imaging apparatus 10. The near-infrared light is capable of being absorbed by hemoglobin in blood (i.e., reduced hemoglobin) while having high penetrability against body tissue. Therefore, when the near-infrared light is radiated to a finger, the palm or the back of a hand, the vein which is spread at the inside thereof appears as a shadow on an image. The shadow which appears the image is called a vein pattern. In order to satisfactorily perform imaging of the vein pattern, the near-infrared light irradiation source 105 irradiates the near-infrared red light of which wavelength is approximately between 600 nm and 1300 nm, and preferably between 700 nm and 900 nm.

Here, when the wavelength of the near-infrared light which is radiated from the near-infrared light irradiation source 105 is shorter than 600 nm or longer than 1300 nm, the ratio of being adsorbed by hemoglobin in blood becomes small. Therefore, it is difficult to obtain the satisfactory vein pattern. On the other hand, when the wavelength of the near-infrared light which is radiated from the near-infrared light irradiation source 105 is approximately between 700 nm and 900 nm, the near-infrared light is specifically adsorbed by both deoxygenated hemoglobin and oxygenated hemoglobin. Therefore, the satisfactory vein pattern can be obtained.

Here, it is possible to adopt a light emitting diode (LED) as the near-infrared light irradiation source 105, for example. Further, instead of the light emitting diode which has the abovementioned frequency band, it is also possible to use a combination of the light emitting diode capable of radiating light including the abovementioned frequency band and a filter which optically restricts the band of the radiated light.

The brightness of the near-infrared light which is radiated from the near-infrared light irradiation source 105 is controlled by the later-mentioned brightness adjustment unit 113.

The imaging element 109 has an imaging surface to which a plurality of photoreceptors are arranged in a grid shape and generates the vein image of the near-infrared light based on the vein penetration light of which image is formed by the microlens array 101. For example, a charge coupled device (CCD) type image sensor, a complementary metal oxide semiconductor type image sensor or the like can be adopted as the imaging element 109 according to the present embodiment. The imaging element 109 outputs the generated vein image (herein after, also called image data). Further, the imaging element 109 may store the generated vein image at the later-mentioned memory unit 121.

Scan timing and the like of the photoreceptor of the imaging element 109 are controlled by a later-mentioned imaging element control unit 111.

The imaging element control unit 111 includes a central processing unit (CPU), a read only memory (ROM), a random access memory (RAM) and the like, for example, and performs drive control of the imaging element 109. More specifically, the imaging element control unit 111 controls the scan timing of the photoreceptor of the imaging element 109 and the like based on a predetermined synchronization signal. Here, the imaging element control unit 111 is capable of referring to various parameters and database etc. which are stored in the later-mentioned memory unit 121 for performing the control of the imaging element 109.

The brightness adjustment unit 113 includes a CPU, a ROM, a RAM and the like, for example. Then, the brightness adjustment unit 113 adjusts the brightness of the near-infrared light which is radiated from the near-infrared light irradiation source 105 in accordance with the synchronization signal for controlling the imaging element 109 and the distance from the near-infrared light irradiation source 105 to a position above the microlens array 101. The brightness adjustment unit 113 is capable of performing the brightness adjustment in accordance with a correction curve 123 which is stored at the later-mentioned memory unit 121.

In the following, the brightness adjustment unit 113 is described in detail.

The memory unit 121 memorizes the correction curve 123 for adjusting the brightness of the near-infrared light which is radiated from the near-infrared light irradiation source 105. In addition, it is also possible to memorize the vein image etc. which is generated by the imaging element 109. Further, in addition to the above, it is also possible to appropriately memorize parameters, process progress, various databases and the like which are required to be stored when the vein imaging apparatus 10 performs some process. The memory unit 121 is capable of being read and written by the imaging element 109, imaging element control unit 111, the brightness adjustment unit 113 and the like.

[Structure of the Vein Imaging Apparatus]

Next, the structure of the vein imaging apparatus according to the present embodiment is described in detail with reference to FIG. 2 and FIG. 3.

As illustrated in FIG. 2, the microlens array 101 of the vein imaging apparatus 10 according to the present embodiment has a plurality of microlenses 103, for example. The microlenses 103 are arranged as a grid shape on a predetermined substrate. Each of the microlenses 103 introduces the vein penetration light which is radiated to the microlens 103 from a light incidence surface into the later-mentioned imaging element 109, as illustrated in FIG. 3, for example. The microlens array 101 is a lens array of which image surface curvature is small so that there is little distortion in the depth direction. Therefore, it is possible to obtain satisfactory image data by utilizing such microlens array 101. Focal point of each of the microlenses 103 which configure the microlens array 101 is set to be at a vein layer position where the vein V as the imaging object of the vein imaging apparatus 10 exists.

It is known that the skin of a human body has a three-layered structure of an epidermis layer, a dermis layer and a hypodermis layer. The abovementioned vein layer exists in the dermis layer. The dermis layer is the layer of which thickness is approximately 2 to 3 mm existing below the position of approximately 0.1 to 0.3 mm from the finger surface. Therefore, by setting the focal point of the microlens 103 at the existing position of the dermis layer (for example, the position of approximately 1.5 to 2.0 mm from the finger surface), the penetration light which penetrates the vein layer can be effectively collected.

Here, the number of the microlenses 103 which are arranged to the microlens array 101 according to the present embodiment is not limited to the example illustrated in FIG. 2. The number of the microlenses 103 which are arranged to the microlens array 101 according to the present embodiment can be freely set in accordance with the size of the living body to be imaged and the size of the imaging element 109.

A plurality of the light emitting diodes as an example of the near-infrared light irradiation source 105 are arranged at opposing ends of the microlens array 101, as illustrated in FIG. 2, for example. It is preferable that the ends to which the light emitting diodes are arranged correspond to the top end and the bottom end of the part of the living body (i.e., a finger FG in the examples illustrated in FIG. 2 and FIG. 3). By arranging the light emitting diodes as described above, the near-infrared light can be radiated from the top direction and the bottom direction of the finger FG.

Here, not limited to the example which is illustrated in FIG. 2, the number of the near-infrared light irradiation source 105 according to the present embodiment can be freely set in accordance with the size of the microlens array 101, the possible area of the irradiation of the near-infrared light irradiation source 105 and the like.

Further, for example, a directivity control plate 107 is provided between the microlens array 101 and the near-infrared light irradiation source 105, as illustrated in FIG. 2 and FIG. 3. The directivity control plate 107 controls directivity of direct light 12 radiated from the near-infrared light irradiation source 105 so that the direct light 12 is not radiated directly to the microlenses 103 of the microlens array 101.

For example, the near-infrared light radiated from the near-infrared irradiation source 105 is propagated upward to the surface of the finger FG and radiated into the finger FG as the direct light 12, as illustrated in FIG. 3. Here, since a human body is an excellent scatterer of near-infrared light, the direct light 12 radiated into the finger FG is propagated while being scattered in every direction. A part of the scattered light proceeds through the abovementioned vein layer as backside scattering light 13 from the backside to the finger surface and penetrates the vein V on the way. The vein penetration light which penetrates the vein is radiated to each of the microlenses 103 which configure the microlens array 101.

Here, the directivity control plate 107 is arranged at a boundary portion of the microlenses 103 which are adjacent each other. With the directivity control plate 107, the directivity of the vein penetration light can be controlled and the vein penetration light to be collected to the imaging element 109 can be selected.

[Brightness Adjustment Unit]

Figure 4A:
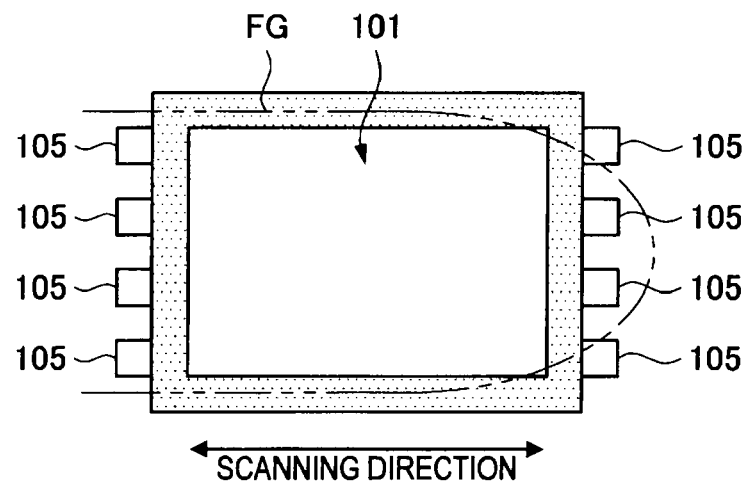
FIG. 4A is an explanatory view which describes the relation between location of a near-infrared light irradiation source and brightness.
Figure 4B:
FIG. 4B is an explanatory view which describes the relation between location of a near-infrared light irradiation source and brightness.
Figure 4C:
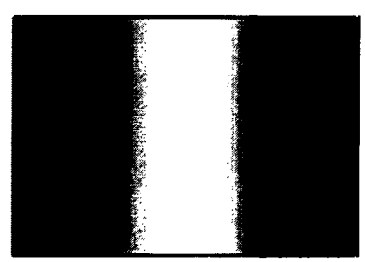
FIG. 4C is an explanatory view which describes the relation between location of a near-infrared light irradiation source and brightness.

Subsequently, the brightness adjustment unit according to the present embodiment is described in detail with reference to FIGS. 4A to 6B. FIGS. 4A to 4C are explanatory views which describe the relation between location of the near-infrared light irradiation source and brightness. FIGS. 5A to 6B are explanatory views which describe the brightness adjustment unit according to the present embodiment.

The vein imaging apparatus 10 according to the present embodiment includes the microlens array 101 and the near-infrared light irradiation sources 105 which are arranged at the opposing ends of the microlens array 101, as illustrated in FIG. 4A, for example. When a part (for example, the finger FG) of the living body is put on the vein imaging apparatus 10, the near-infrared light irradiation source 105 irradiates the near-infrared light. Then, the imaging element performs line scanning against the vein penetration light collected by the microlens array 101 and generates the vein image. Here, as illustrated in FIG. 4A, the scanning direction of the imaging element is the direction perpendicular to the side of the microlens array to which the near-infrared light irradiation source 105 is arranged, namely, the top-to-bottom direction of the finger. In the following, the scanning direction along the top-to-bottom direction of the finger is called the vertical direction.

In the vein imaging apparatus 10 configured as illustrated in FIG. 4A, in the case that the brightness of the near-infrared light radiated from the near-infrared light irradiation source 105 is not adjusted, the brightness becomes higher the closer it is to the light source 105 and becomes lower the further it is from the light source 105, as illustrated in FIG. 4B. As a result, in the case that the brightness is not adjusted, the brightness at the part of the approximate center along the vertical direction of the microlens array 101 becomes low so that the degree of illumination is not to be uniform, as illustrated in FIG. 4B.

Here, by decreasing the brightness of the near-infrared light which is radiated from the light source 105 at the vicinity thereof and increasing the brightness at the approximate center part, such non-uniformity of the illumination can be resolved without decreasing sensitivity of the apparatus as in a case of adopting a brightness distribution filter.

In order to perform the brightness control as described above, the vein imaging apparatus 10 according to the present embodiment is provided with the brightness adjustment unit 113.

[First Example of the Brightness Adjustment Unit]

Figure 5A:
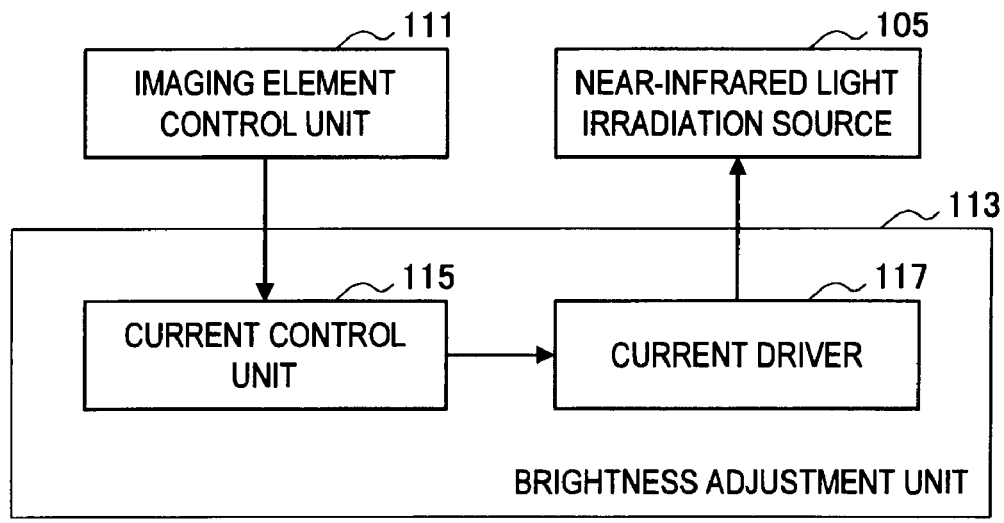
FIG. 5A is an explanatory view which describes a brightness adjustment unit according to the present embodiment.
Figure 5B:
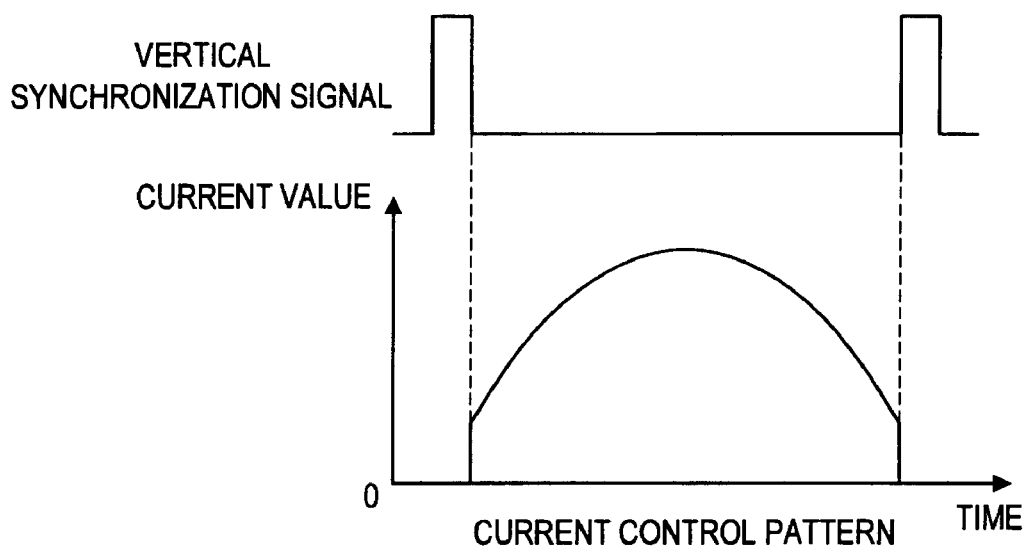
FIG. 5B is an explanatory view which describes a brightness adjustment unit according to the present embodiment.

FIG. 5A and FIG. 5B illustrate an example of the brightness adjustment unit 113 according to the present embodiment. As illustrated in FIG. 5A, the example of the brightness adjustment unit 113 includes a current control unit 115 and a current driver 117.

For example, the current control unit 115 includes a CPU, a ROM, a RAM and the like. A signal which is similar to the synchronization signal input to the imaging element control unit 111 is input to the current control unit 115. The current control unit 115 controls the current amount to be supplied to the near-infrared light irradiation source 105 via the later-mentioned current driver 117 in synchronization with ON-OFF operation of the synchronization signal. More specifically, in order to actualize current amount variation with time as illustrated as the correction curve of FIG. 5B, the current control unit 115 outputs a control signal of an appropriate current amount to the current driver 117 and adjusts the brightness of the light source 105 in the scanning direction.

For example, the current driver 117 includes a CPU, a ROM, a RAM and the like and supplies current to the near-infrared light irradiation source 105 based on the control signal of the current amount which is output from the current control unit 115.

In the vein imaging apparatus 10 according to the present embodiment, the vertical scanning direction of the imaging element 109 is set to be perpendicular to the aligning direction of the light sources 105. Accordingly, the brightness control of the light source 105 can be performed in synchronization with light receiving timing of a horizontal line with the vertical synchronization signal.

As clearly seen from FIG. 5B, the correction curve of the current amount in the present example shapes to increase the current amount with time and to decrease the current amount from some point of time. When the horizontal line is in the vicinity of the light source 105 (i.e., when time is close to zero), the control of the current amount is performed while monitoring whether or not the image data is saturated in 8 bits conversion, for example. Then, as the horizontal line proceeds toward the center part of the microlens array 101 and the scattering light from the inside of the living body decreases, the current amount supplied to the light source 105 is increased. In this manner, the brightness distribution of the near-infrared light as illustrated in FIG. 4C can be actualized.

[Second Example of the Brightness Adjustment Unit]

Figure 6A:
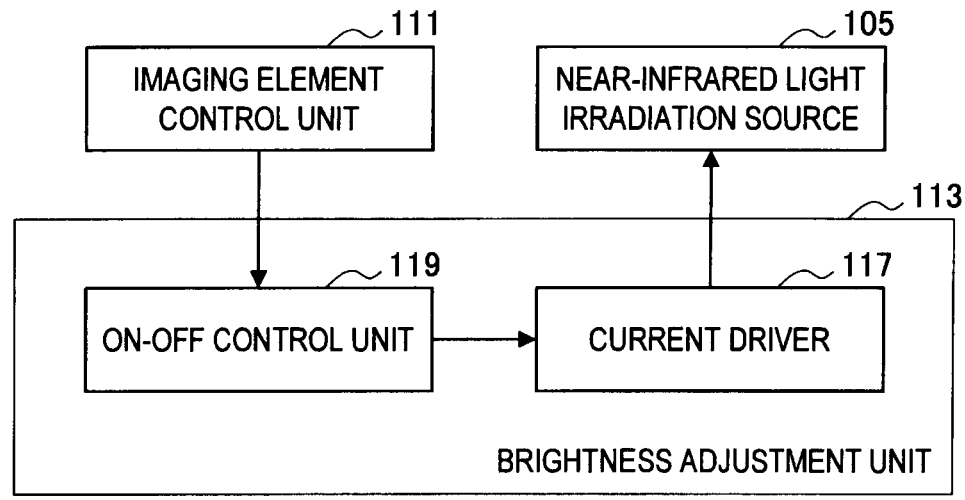
FIG. 6A is an explanatory view which describes a brightness adjustment unit according to the present embodiment.
Figure 6B:
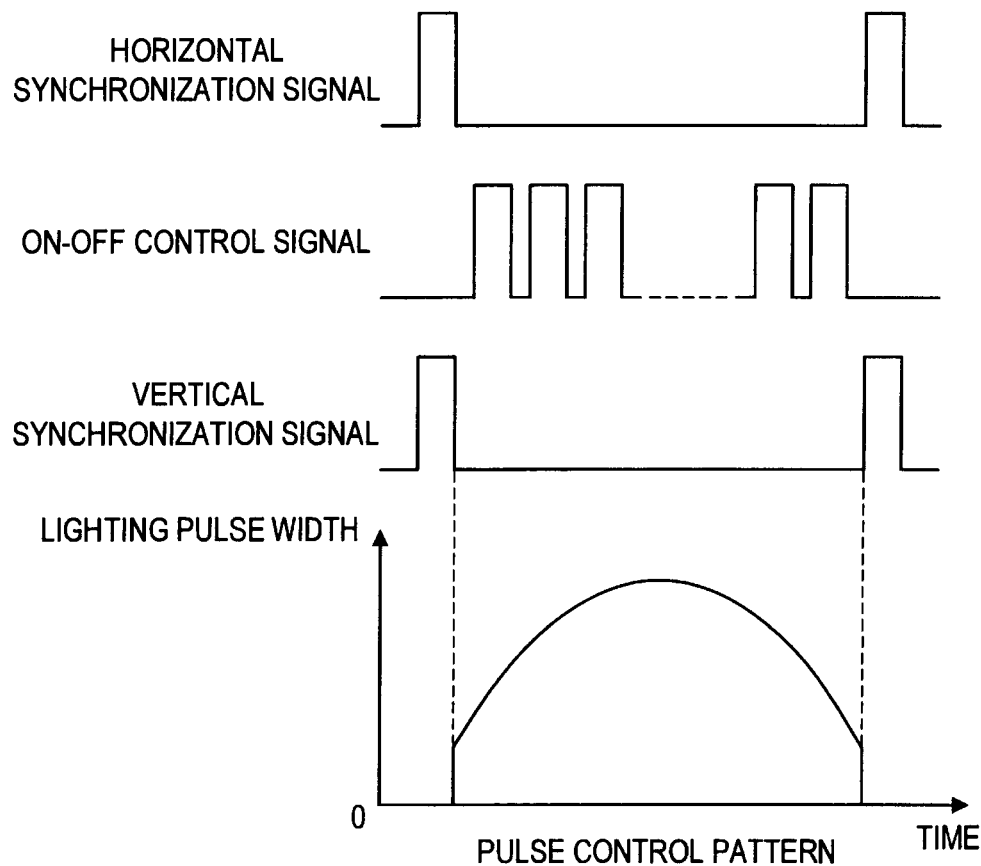
FIG. 6B is an explanatory view which describes a brightness adjustment unit according to the present embodiment.

FIG. 6A and FIG. 6B illustrate an example of the brightness adjustment unit 113 according to the present embodiment. As illustrated in FIG. 6A, the example of the brightness adjustment unit 113 includes the current driver 117 and an ON-OFF control unit 119.

For example, the ON-OFF control unit 119 includes a CPU, a ROM, a RAM and the like. In the previous example, the brightness of the near-infrared light radiated from the near-infrared light irradiation source 105 is controlled by the amount of the current supplied to the light source 105. In this example, the brightness distribution as illustrated in FIG. 4C is actualized by controlling lighting time of the near-infrared light irradiation source 105.

A signal which is similar to the synchronization signal input to the imaging element control unit 111 is input to the ON-OFF control unit 119. The ON-OFF control unit 119 controls the lighting time of the near-infrared irradiation source 105 via the current driver 117 in synchronization with ON-OFF operation of the synchronization signal. More specifically, in order to actualize lighting time variation as illustrated as the correction curve in FIG. 6B, the ON-OFF control unit 119 outputs a control signal of an appropriate lighting pulse width to the current driver 117 and adjusts the brightness of the light source 105 in the scanning direction. As illustrated in FIG. 6B, the control of the lighting time is performed by controlling the lighting pulse width. The pulse width control can be performed by controlling pulse number of the ON-OFF control signal which is input to the current driver 117.

The current driver 117 of the present example includes a CPU, a ROM, a RAM and the like, for example, and appropriately supplies current to the near-infrared light irradiation source 105 based on the control signal of the pulse width which is output from the ON-OFF control unit 119.

As clearly seen from FIG. 6B, the correction curve of the pulse width in the present example shapes to increase the pulse width with time and decrease the pulse width from some point of time. When the horizontal line is in the vicinity of the light source 105 (i.e., when time is close to zero), the control of the pulse width is performed while monitoring whether or not the image data is saturated in 8 bits conversion, for example. Then, as the horizontal line proceeds toward the center part of the microlens array 101 and the scattering light from the inside of the living body decreases, the pulse width is increased. In this manner, the brightness distribution of the near-infrared light as illustrated in FIG. 4C can be actualized.

Here, the correction curves which are illustrated in FIG. 5B and FIG. 6B are previously set so as to satisfy both the degree of saturation at both ends thereof and sensitivity shortage at the approximate center part. For example, a correction curve is measured when firstly performing imaging of a vein and previously stores at the memory unit 121. Then, by referring the stored correction curve 123 at subsequent processes, the processing speed of the vein imaging apparatus 10 according to the present embodiment can be improved.

Incidentally, in the abovementioned time control, it is preferable to change the timing of the synchronization signal in accordance with the type of the imaging element 109. This is because the reset timing of the element is preferred to be appropriately adjusted since the data reading characteristics are different between the case that the imaging element 109 is a CCD and the case that the imaging element 109 is a CMOS.

The abovementioned example is described as the case that the brightness of the near-infrared light radiated from the near-infrared light irradiation source 105 is controlled with the current amount or the pulse width. In addition, it is also possible that the correction of the brightness distribution is performed by electronic shutter control of the imaging element 109. Further, it is also possible to perform the correction of the brightness distribution by utilizing various image processing technologies.

Up to this point, an example of functions of the vein imaging apparatus 10 according to the present embodiment has been described. Each of the structural components described above can be configured by a general member or circuit or configured by hardware which is specialized for the function of each of the structural components. Further, it is also possible that every function of the structural components is performed by the CPU and the like. Accordingly, it is also possible to appropriately change the structure to be adopted in accordance with the technology level of when the present embodiment is actualized.

<Operation of the Vein Imaging Apparatus>

In the abovementioned vein imaging apparatus 10, when a part of the living body (for example, a finger) is put on the microlens array 101, the near-infrared light irradiation source 105 is lighted and preparation of imaging is performed. At the same time, it is determined whether or not the correction curve 123 is previously registered by referring to the memory unit 121. In the case that the correction curve 123 is previously registered, the brightness adjustment unit 113 performs the brightness control of the light source 105 with reference to the registered correction curve 123. On the contrary, in the case that the registered correction curve does not exist, the brightness adjustment unit 113 controls the brightness so as to satisfy both the saturation degree of the data output from the imaging element 109 and the sensitivity shortage at the approximate center part.

Next, based on the input synchronization signal, the brightness adjustment unit 113 controls the driving of the near-infrared light irradiation source 105 while adjusting the brightness so that the part of the living body is irradiated with the near-infrared light. Simultaneously, the imaging element 109 performs the imaging of the part of the living body which is irradiated with the brightness-adjusted near-infrared light based on the input synchronization signal. In this manner, the vein image of the living body which is evenly irradiated with the near-infrared light is generated.

With the abovementioned vein imaging apparatus, a brightness suppressing ratio in an imaging range of which imaging width (i.e., width in the scanning direction) is approximately 30 mm was measured to be approximately one over thirty-two. The result indicates that the illumination power of the near-infrared light irradiation source 105 can be suppressed to one over thirty-two by using the vein imaging apparatus according to the present embodiment.

<Mounting Example of the Vein Imaging Apparatus into the Vein Authentication Apparatus>

Figure 7:
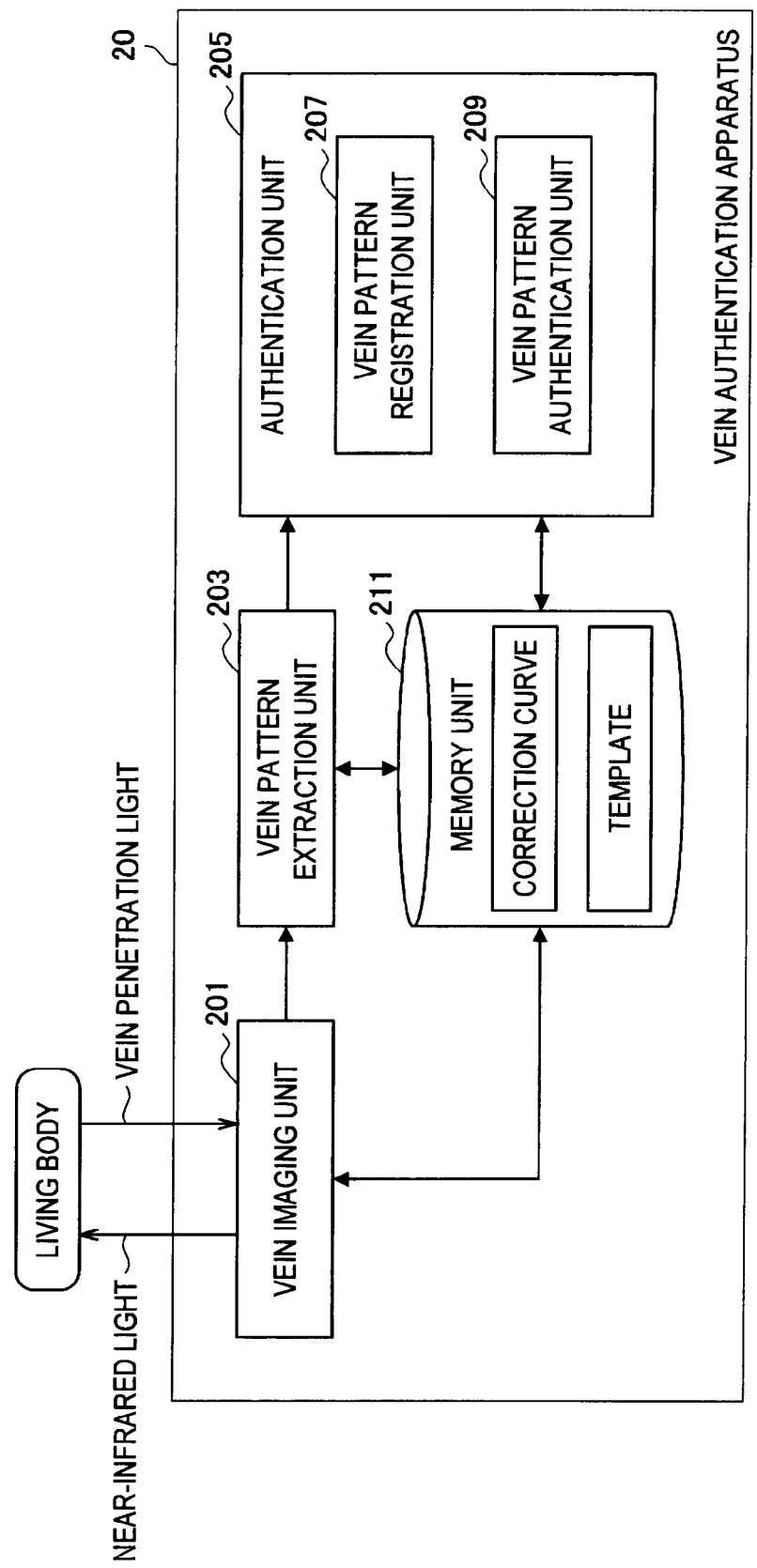
FIG. 7 is a block diagram which describes the configuration of a vein authentication apparatus according to the present embodiment.

Next, an example of a case that the vein imaging apparatus 10 according to the present embodiment is mounted into a vein authentication apparatus is described in detail with reference to FIG. 7. FIG. 7 is a block diagram which describes the configuration of the vein authentication apparatus according to the present embodiment.

A vein authentication apparatus 20 according to the present embodiment mainly includes a vein imaging unit 201, a vein pattern extraction unit 203, an authentication unit 205 and a memory unit 211, as illustrated in FIG. 7, for example.

The vein imaging unit 201 of which configuration is similar to the vein imaging apparatus 10 according to the present embodiment radiates the brightness-adjusted near-infrared light to a part of a living body while referring to a correction curve stored at the later-mentioned memory unit 211 and generates a vein pickup image in which a vein existing in the living body is imaged. The vein imaging unit 201 transmits the generated vein pickup image to the later-mentioned vein pattern extraction unit 203. It is also possible that the vein imaging unit 201 stores the generated vein pickup image at the later-mentioned memory unit 211.

For example, the vein pattern extraction unit 203 which is configured to have a CPU, a ROM, a RAM and the like includes functions of performing pre-processing of the vein pattern extraction, extracting the vein pattern and performing post-processing of the vein pattern extraction against the vein pickup image transmitted from the vein imaging unit 201.

Here, for example, the abovementioned pre-processing of the vein pattern extraction includes a process to detect an outline of the finger from the vein pickup image and to identify the finger position in the pickup image, a process to correct the angle of the pickup image by rotating the pickup image by utilizing the detected finger outline, and the like.

The abovementioned extraction of the vein pattern is performed by applying a differential filter against the pickup image to which the outline detection and the angle correction are completed. The differential filter is the filter which outputs a large value at a part where the difference between an attention-focused pixel and ambient pixels thereof is large. In other words, the differential filter is the filter which emphasizes a line or an edge with arithmetic with the difference of graduation values of the attention-focused pixel and the vicinity thereof.

In general, when a filtering process is performed with a filter h(x, y) against image data u(x, y) having a lattice point (x, y) on a two-dimensional plane as variables, image data v(x, y) is generated as described in the following Equation 1. Here, notation '*' in the Equation 1 denotes convolution integral.

$$v(x, y) = u(x, y) * h(x, y) \quad \text{(Equation 1)}$$
$$= \sum_{m_1}\sum_{m_2} h(m_1, m_2)u(x - m_1, y - m_2)$$
$$= \sum_{m_1}\sum_{m_2} u(m_1, m_2)h(x - m_1, y - m_2)$$

For the extraction of the vein pattern according to the present embodiment, a differential filter such as a primary space differential filter and a quadratic space differential filter can be used for the abovementioned differential filter. The primary space differential filter is the filter which calculates the difference of the graduation values of the pixels adjacent to the attention-focused pixel in the horizontal direction and the vertical direction. The quadratic space differential filter is the filter which extracts a part of which variation amount of the difference of the graduation values is large for the attention-focused pixel.

For example, it is possible to use a Laplacian of Gaussian (Log) filter which is described in the following as the quadratic space differential filter. The Log filter (as in Equation 3) is expressed by secondary differential of the Gaussian filter (as in Equation 2) which is a smoothing filter with the Gaussian function. Here, in Equation 2, notation σ denoting standard deviation of the Gaussian function is a variable which expresses the degree of smoothing of the Gaussian filter. Further, in Equation 3, notation σ is a parameter expressing standard deviation of the Gaussian function being similar to Equation 2. It is possible to change output value of a case that the Log filter process is performed by changing the value of σ.

$$h_{gauss}(x, y) = \frac{1}{2\pi\sigma^2}\exp\left\{-\frac{(x^2 + y^2)}{2\sigma^2}\right\} \quad \text{(Equation 2)}$$

$$h_{Log}(x, y) = \nabla^2 \cdot h_{gauss}(x, y) \quad \text{(Equation 3)}$$
$$= \left(\frac{\partial^2}{\partial x^2} + \frac{\partial^2}{\partial y^2}\right)h_{gauss}$$
$$= \frac{(x^2 + y^2 - 2\sigma^2)}{2\pi\sigma^6}\exp\left\{-\frac{(x^2 + y^2)}{2\sigma^2}\right\}$$

Here, for example, the abovementioned post-processing of the vein pattern extraction includes a threshold value process, a binarization process, a thinning process and the like which are performed against the pickup image after the differential filtering is applied. It becomes possible to extract a skeleton of the vein pattern after performing these processes.

The vein pattern extraction unit 203 transmits the vein pattern and the skeleton which are extracted as mentioned above to the later-mentioned authentication unit 205 etc. It is also possible that the vein pattern extraction unit 203 stores the extracted vein pattern and skeleton at the later-mentioned memory unit 211. Further, the vein pattern extraction unit 203 may also store parameters, process progress and the like which are generated during performing each of the above-mentioned processes at the memory unit 211.

For example, the authentication unit 205 is configured to have a CPU, a ROM, a RAM and the like. The authentication unit 205 registers the vein pattern generated by the vein pattern extraction unit 203 as a template and performs the authentication of the vein pattern by comparing the vein pattern generated by the vein pattern extraction unit 203 with a previously registered template. For example, the authentication unit 205 further includes a vein pattern registration unit 207 and a vein pattern authentication unit 209.

The vein pattern registration unit 207 registers the vein pattern generated by the vein pattern extraction unit 203 at the later-mentioned memory unit 211 as the template. In addition to the vein pattern, when registering the registration vein pattern, it is also possible to memorize other data (for example, fingerprint data, face image data, iris data, voice print data and the like) which identifies the person having the vein pattern being associated with the vein pattern. Further, it is also possible that the registration vein pattern which is registered as the template has header information in adherence to a common biometric exchange file format (CBEFF) etc., for example.

The vein pattern authentication unit 209 performs the authentication based on the vein pattern generated by the vein pattern extraction unit 203 and the template of the previously registered vein pattern. The vein pattern authentication unit 209 requests disclosure of the registration vein pattern against the later-mentioned memory unit 211 and performs comparison between the obtained registration vein pattern and the vein pattern transmitted from the vein pattern extraction unit 203. The comparison between the registration vein pattern and the transmitted vein pattern is possible to be performed based on a correlation coefficient which is calculated as expressed in the following, for example. The vein pattern authentication unit 209, as a result of the comparison, authenticates the transmitted vein pattern when the transmitted vein pattern is similar to the registration vein pattern and does not authenticate when it is not similar.

The correlation coefficient defined by following Equation 4 is a statistical measure which expresses degree of similarity between two data of x={xi} and y={yi} and takes real values between −1 to 1. When the correlation coefficient is close to 1, it indicates that the two data are similar. When the correlation coefficient is close to 0, it indicates that the two data are not similar. Further, when the correlation coefficient is close to −1, it indicates that signs of the two data are reversed.

$$r = \frac{\sum_i (x_i - \bar{x})(y_i - \bar{y})}{\sqrt{\sum_i (x_i - \bar{x})^2} \sqrt{\sum_i (y_i - \bar{y})^2}} \quad \text{(Equation 4)}$$

$\bar{x}$: Average value of data $x$ $\bar{y}$: Average value of data $y$

Further, the vein pattern authentication unit 209 may store the authentication result to be associated with authentication time etc. as authentication history at the memory unit 211. By generating the authentication history as mentioned above, it is possible to know when and whom requested the vein pattern and when and whom used the vein authentication apparatus 20.

The memory unit 211 memorizes the registration vein pattern which is requested to be registered by the vein pattern registration unit 207 and other data associated with the registration vein pattern. In addition to these data, it is also possible that the memory unit 211 memorizes the vein image which is generated by the vein imaging unit 201, the vein pattern which is extracted by the vein pattern extraction unit 203, the correction curve for performing brightness control of the light source and the like. Further, in addition to these data, it is also possible that the memory unit 211 appropriately memorizes various parameters, process progress, various databases and the like which are required to be stored when the vein imaging unit 20 performs some process. The memory unit 211 is capable of being read and written by the vein imaging unit 201, the vein pattern extraction unit 203, the authentication unit 205 and the like.

Up to this point, an example of functions of the vein authentication apparatus 20 according to the present embodiment has been described. Each of the structural components described above can be configured by a general member or circuit or configured by a hardware which is specialized for the function of each of the structural components. Further, it is also possible that every function of the structural components is performed by the CPU and the like. Accordingly, it is also possible to appropriately change the structure to be adopted in accordance with the technology level of when the present embodiment is actualized.

Here, for example, the vein authentication apparatus 20 according to the present embodiment may be mounted to various apparatus such as an information processing apparatus of a computer and a server etc., a portable terminal and a personal digital assistance (PDA) of a cellular phone and PHS etc., an automated teller machine (ATM), a room access management apparatus, a game device or a controller thereof.

In the above description, the registration vein pattern which is registered as the template is stored in the vein authentication apparatus 20. However, the registration vein pattern may be stored at a memory medium such as a DVD medium, HD-DVD medium, a Blu-ray medium, a compact flash (which is a registered trademark), a memory stick and a SD memory card, or an IC card or electronic equipment etc. on which a non-contact type IC chip is mounted. It is also possible that the registration vein pattern is stored at a server which is connected to the vein authentication apparatus 20 via a communication network such as the Internet.

<Hardware Configuration>

Next, the hardware configuration of the vein imaging apparatus 10 according to each of the embodiments of the present invention is described in detail with reference to FIG. 8. FIG. 8 is a block diagram which describes the hardware configuration of the vein imaging apparatus 10 according to each of the embodiments of the present invention.

The vein imaging apparatus 10 mainly includes a CPU 901, a ROM 903, a RAM 905, a host bus 907, a bridge 909, an external bus 911, an interface 913, an input device 915, an output device 917, a storage device 919, a drive 921, a connection port 923 and a communication device 925.

The CPU 901 functions as an arithmetic processing apparatus and a control apparatus and controls the whole or a part of the operation in the vein imaging apparatus 10 in accordance with various programs stored at the ROM 902, the RAM 905, the storage device 919 or a removal recording medium 927. The ROM 903 memorizes programs, arithmetic parameters and the like which are used for the CPU 901. The RAM 905 temporally memorizes programs which are used during execution of the CPU 901, parameters which appropriately vary during the execution and the like. These are connected one another by the host bus 907 which are configured by an internal bus such as a CPU bus.

The host bus 907 is connected to the external bus 911 such as a peripheral component interconnect/interface (PCI) bus via the bridge 909.

The input device 915 is operation means, such as a mouse, a keyboard, a touch panel, a button, a switch and a lever which is operated by the user. Further, for example, the input device 915 can be remote control means (i.e., so-called a remocon) which utilizes infrared light or other radio waves or can be the external connection device 929 such as a cellular phone and a PDA which are supported to the operation of the vein imaging apparatus 10. In addition, for example, the input device 915 includes an input control circuit etc. which generates an input signal based on the input information by the user with the abovementioned operation means and outputs the input signal to the CPU 901. The user of the vein imaging apparatus 10 can input various data and direct processing operations to the vein imaging apparatus 10 by operating the input device 915.

The output device 917 is configured to have an apparatus which is capable of informing of the obtained information visually or acoustically to the user. For example, the output device 917 is a display apparatus such as a CRT display apparatus, a liquid crystal display apparatus, a plasma display apparatus, an EL display apparatus and a lamp etc., an audio output device such as a speaker and a headphone etc., a printer apparatus, a cellular phone, a facsimile machine and the like. For example, the output device 917 outputs a result obtained by various processes which are performed by the vein imaging apparatus 10. Specifically, the display device displays a result obtained by the various processes which are performed by the vein imaging apparatus 10 as a text or an image. On the other hand, the audio output device outputs an audio signal which is configured to have reproduced voice data and sound data etc. while converting into an analog signal.

The storage device 919 is an apparatus for data accommodation which is configured as an example of the memory unit of the vein imaging apparatus 10. For example, the storage device 919 is configured to have a magnetic memory device of a hard disk drive (HDD) etc., a semiconductor memory device, an optical memory device, an optical magnetic memory device, or the like. The storage device 919 stores programs and various data which are executed by the CPU 901, various data which are obtained from the outside, and the like.

The drive 921 is a reader/writer for a recording medium. The drive 921 is integrated into or externally mounted to the vein imaging apparatus 10. The drive 921 reads the information stored at the mounted removal recording medium 927 such as a magnetic disk, an optical disk, an optical magnetic disk, a semiconductor memory or the like and outputs the information to the RAM 905. Further, it is also possible that the drive 921 writes a record at the mounted removable recording medium 927 such as the magnetic disk, the optical disk, the optical magnetic disk, the semiconductor memory or the like. For example, the removable recording medium 927 is a DVD medium, an HD-DVD medium, a Blu-ray medium, a Compact-Flash (a registered trademark, CF), a memory stick, a secure digital memory card (SD memory card) or the like. Further, for example, the removable recording medium 927 may be an integrated circuit card (IC card), an electronic device or the like to which a non-contact type IC chip is mounted.

The connection port 923 is a port for directly connecting a device to the vein imaging apparatus 10. For example, the connection port 923 is a universal serial bus (USB), an IEEE1394 port of i.Link etc., a small computer system interface (SCSI) port, an RS-232C port, an optical audio terminal, a high definition multimedia interface (HDMI) port or the like. By connecting the external connection device 929 to the connection port 923, the vein imaging apparatus 10 can directly obtain various data from the external connection device 929 and supplies various data to the external connection device 929.

The communication device 925 is a communication interface which is, for example, configured to have a communication device etc. for connecting to a communication network 931. For example, the communication device 925 is a wired or wireless local area network (LAN), a communication card for Bluetooth or wireless USB (WUSB), a router for optical communication, a router for an asymmetric digital subscriber line (ADSL), a modem for various communications or the like. For example, the communication device 925 can perform transmission and reception of a signal etc. to and from the Internet or other communication devices in adherence to a predetermined protocol of TCP/IP etc. Further, the communication network 931 connected to the communication device 925 is configured by a network etc. which is connected with wire or wirelessly. For example, the communication network 931 may be the Internet, a home LAN, infrared communication, radio wave communication, satellite communication or the like.

Up to this point, an example of the hardware configuration capable of performing the functions of the vein imaging apparatus 10 according to each of the embodiments of the present invention has been described. Each of the structural components described above may be configured by a general member or hardware specialized for the function of each of the structural components. Therefore, the hardware configuration for usage may be appropriately changed in accordance with the technology level of when the present embodiment is actualized.

Here, the hardware configuration of the vein authentication apparatus 20 according to each of the embodiments of the present invention is almost the same as the hardware configuration of the vein imaging apparatus 10 according to each of the embodiments of the present invention and has similar effects. Therefore, the detailed description is omitted.

<Summary>

As described above, with the vein imaging apparatus according to each of the embodiments of the present invention, imaging of a finger vein can be performed by utilizing the flat sensor in which the microlens array and the near-infrared light irradiation source are integrated. Further, the vein imaging apparatus according to each of the embodiments of the present invention can suppress the brightness of the near-infrared light irradiation source which is mounted to the flat sensor.

Further, the vein imaging apparatus according to each of the embodiments of the present invention can perform vein imaging with a TFT sensor since the brightness distribution control is actualized without sacrificing sensor sensitivity.

Furthermore, the vein imaging apparatus according to each of the embodiments of the present invention can be jointly used as a sensor display since display unevenness of the image is not caused. In addition, it is also possible to be jointly used as a touch pad sensor since the brightness distribution is controlled only when the vein imaging is performed.

The present application contains subject matter related to that disclosed in Japanese Priority Patent Application JP 2008-215841 filed in the Japan Patent Office on Aug. 25, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A vein imaging apparatus comprising:
   a lens array to which a plurality of light receiving lenses are arranged in an array shape;
   a plurality of near-infrared light irradiation sources which are respectively arranged at opposing ends of the lens array and which irradiate a part of a living body with near-infrared light;

an imaging element which generates a pickup image of a vein based on near-infrared light which is collected by the lens array and which is scattered in the living body and penetrates through the vein; and a brightness adjustment unit which adjusts brightness of the near-infrared light radiated from the near-infrared light irradiation source in accordance with a synchronization signal for controlling the imaging element and distance from the near-infrared light irradiation source.

2. The vein imaging apparatus according to claim 1, wherein the imaging element performs line scanning in the direction perpendicular to a side of the lens array to which the near-infrared light irradiation source is arranged.

3. The vein imaging apparatus according to claim 2, wherein the brightness adjustment unit varies brightness of the near-infrared light with time along the scanning direction of the imaging element.

4. The vein imaging apparatus according to claim 3, wherein the brightness adjustment unit decreases the brightness of the near-infrared light at the vicinity of the near-infrared light irradiation source and increases the brightness of the near-infrared light toward the approximate center of the lens array.

5. The vein imaging apparatus according to claim 3, wherein the brightness adjustment unit varies the brightness with time in accordance with a predetermined correction curve.

6. The vein imaging apparatus according to claim 5, wherein the brightness adjustment unit further comprises a current control unit which controls current amount to be supplied to the near-infrared light irradiation source.

7. The vein imaging apparatus according to claim 5, wherein the brightness adjustment unit further comprises an ON-OFF control unit which performs ON-OFF control of the near-infrared light irradiation source, and the ON-OFF control unit varies the brightness with time in accordance with width and frequency of a pulse which is used for the ON-OFF control of the near-infrared light irradiation source.

8. A vein imaging method comprising the steps of:

irradiating a part of a living body with near-infrared light of which brightness is adjusted by a vein imaging apparatus; and imaging the part of the living body which is irradiated with the brightness adjusted near-infrared light in accordance with a synchronization signal and generating a pickup image of a vein, wherein the vein imaging apparatus includes a lens array to which a plurality of light receiving lenses are arranged in an array shape, a plurality of near-infrared light irradiation sources which are respectively arranged at opposing ends of the lens array and which irradiate the part of the living body with near-infrared light, an imaging element which generates the pickup image of the vein based on near-infrared light which is collected by the lens array and which is scattered in the living body and penetrates through the vein, and a brightness adjustment unit which adjusts brightness of the near-infrared light radiated from the near-infrared light irradiation source in accordance with the synchronization signal for controlling the imaging element and distance from the near-infrared light irradiation source.

9. A vein authentication apparatus comprising:

a vein imaging unit;

a vein pattern extraction unit which extracts a vein pattern from a pickup image of a vein generated by the vein imaging unit; and an authentication unit which performs an authentication process based on the extracted vein pattern, wherein the vein imaging unit includes a lens array to which a plurality of light receiving lenses are arranged in an array shape, a plurality of near-infrared light irradiation sources which are respectively arranged at opposing ends of the lens array and which irradiate a part of a living body with near-infrared light;

an imaging element which generates the pickup image of the vein based on near-infrared light which is collected by the lens array and which is scattered in the living body and penetrates through the vein; and a brightness adjustment unit which adjusts brightness of the near-infrared light radiated from the near-infrared light irradiation source in accordance with a synchronization signal for controlling the imaging element and distance from the near-infrared light irradiation source.

* * * * *